Sept. 21, 1971 L. W. LLEWELLYN 3,606,870
INTERNAL COMBUSTION ENGINE FUEL INJECTION ACTIVATION MEANS
Filed Oct. 21, 1969 3 Sheets-Sheet 1
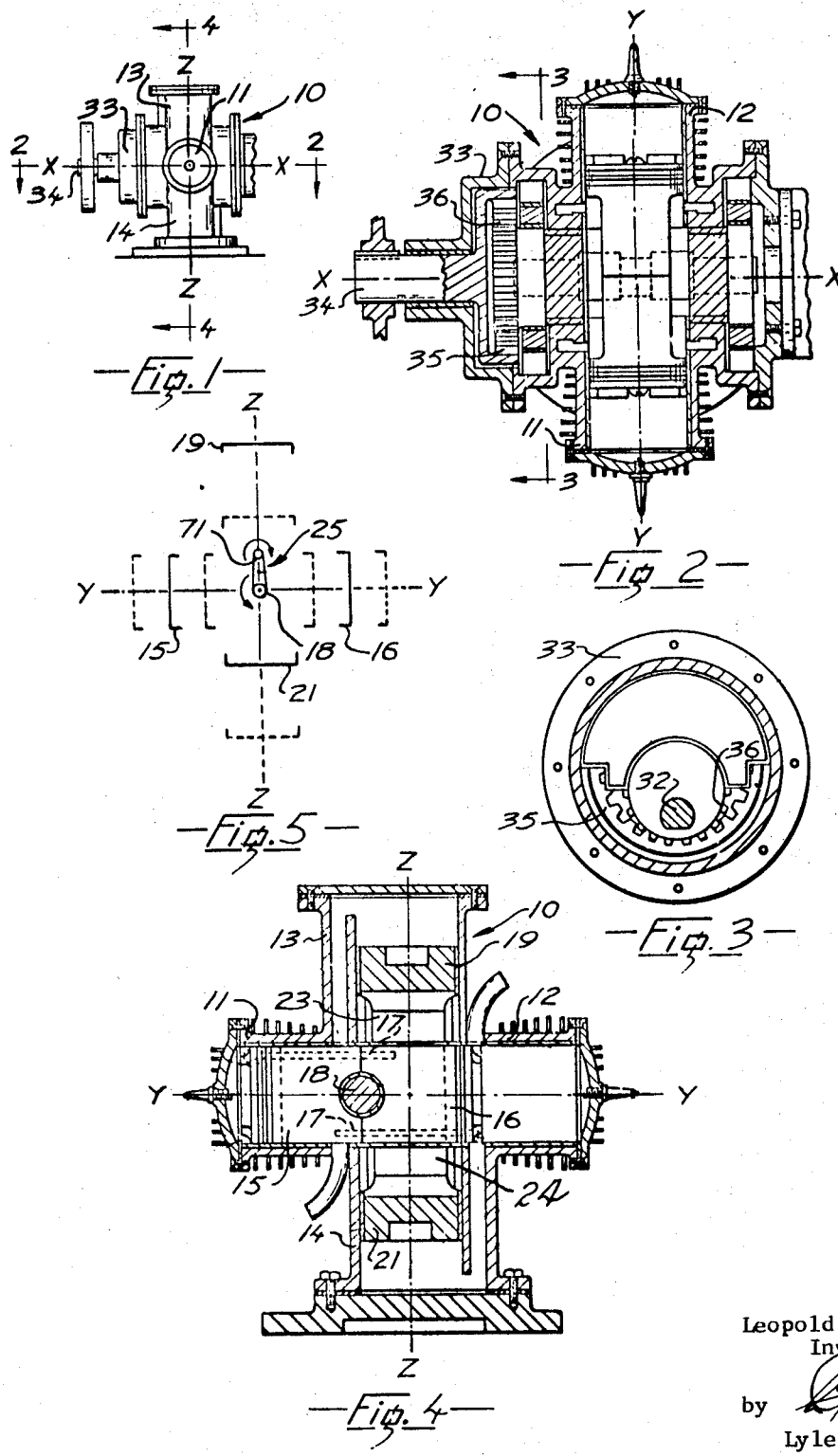
Leopold W. Llewellyn,
Inventor
by 
Lyle G. Trorey,
Agent

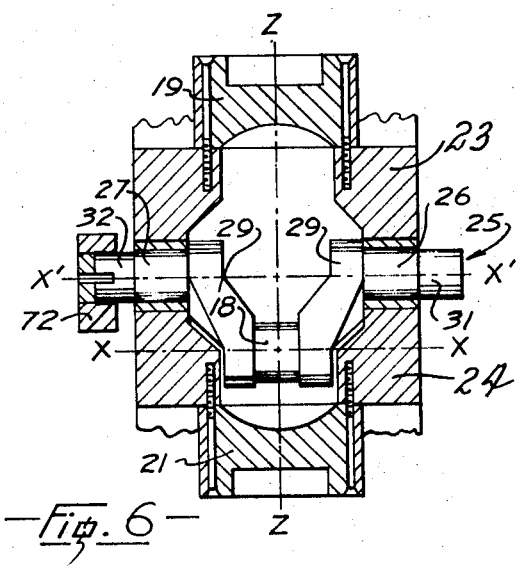
Fig. 6
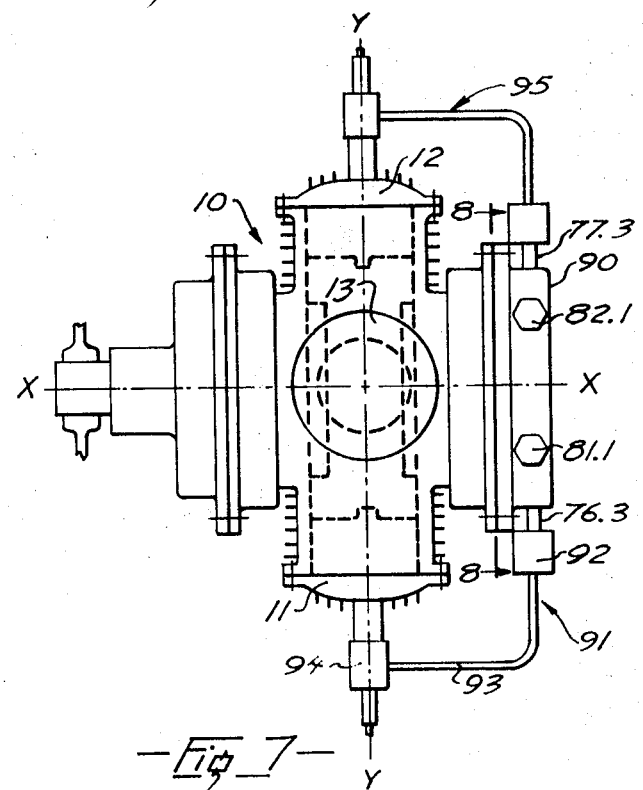
Fig. 7
Leopold W. Llewellyn,
Inventor
by 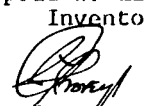
Lyle G. Trorey,
Agent

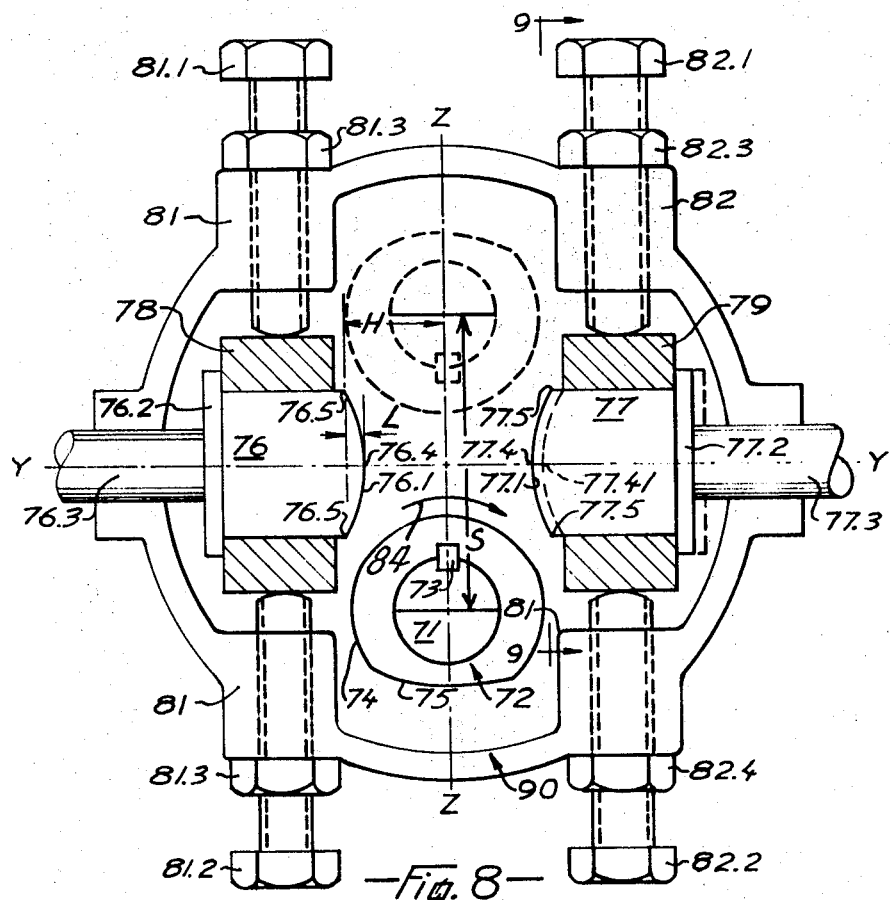
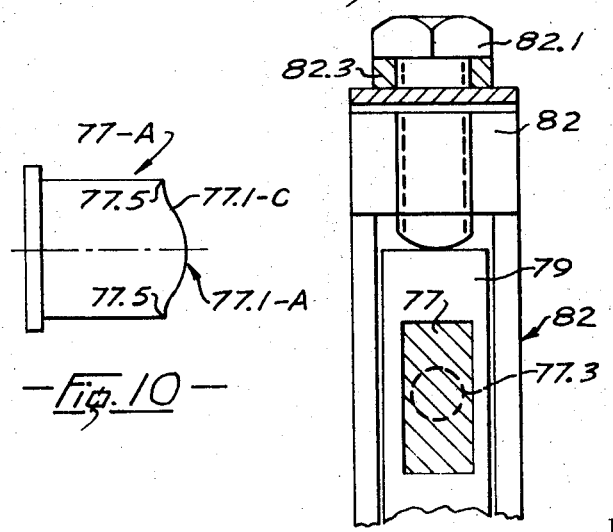

1

United States Patent Office 3,606,870
Patented Sept. 21, 1971

3,606,870
INTERNAL COMBUSTION ENGINE FUEL INJECTION ACTIVATION MEANS
Leopold W. Llewellyn, 4740 Southlawn, Burnaby, British Columbia, Canada
Filed Oct. 21, 1969, Ser. No. 868,197
Claims priority, application Great Britain, Oct. 26, 1968, 50,904/68
Int. Cl. F02b 75/24
U.S. Cl. 123—56B            9 Claims

ABSTRACT OF THE DISCLOSURE

An internal combustion engine according to U.S. Patent 3,329,132 has a crankshaft having an unusual motion. The engine has opposed aligned charge cylinders at right angles to opposed aligned power cylinders. Spaced aligned crank pins reciprocate along an axis concurrently rotating. This motion is utilized to activate common fuel injectors. A cylindrical cam secured co-axial with one aligned crank pin operates one lifter when moving in one direction, and operates a second lifter when moving in an opposite direction. Push rods of each lifter activate separate injectors delivering a fuel charge to each power cylinder near top dead centre of compression stroke. Adjustable timing of injection. Minimal impact reduces noise and wear of cam and lifters.

BACKGROUND OF THE INVENTION

Field of the invention

The present invention relates to an internal combustion engine in (USPO) Class 123—55, and in particular to a fuel injection activation means for an internal combustion engine of a type according to United States Patent 3,329,134 issued July 4, 1967, to the present inventor, Leopold W. Llewellyn, P. Eng.

Prior art

The United States patent above teaches an internal combustion engine having a power piston reciprocating within aligned power cylinders, and a charge piston reciprocating within aligned charge cylinders, paths of the reciprocations intersecting and being mutually perpendicular. An output shaft has an axis passing through the intersection of the reciprocating paths mutually perpendicular thereto, the output shaft axis being an engine axis. The power piston has two elements secured to one another at abutting inner ends, outer ends of the elements forming piston heads. A crankshaft has a central crank pin journalled in the abutting ends of the power piston elements, the crankshaft having also two spaced, aligned, coaxial, outer crank pins. The charge piston is an assembly having two elements interconnected by spaced slide blocks secured thereto, outer ends of the slide block elements forming piston heads. The spaced slide blocks have horizontally aligned bearings in which the two aligned crank pins rotate, and transversely spaced guides of which the blocks are slideable, being constructed and arranged so that the charge piston assembly is slideably supported by the blocks and by the charge cylinder. An extension of the crankshaft has a pinion secured thereto, the pinion being eccentric with respect to the axis of the aligned crank pins. A ring gear has internal teeth in engagement with teeth of the pinion, the ring gear being secured to the output shaft which shaft is journalled in an end wall in a housing of the engine—the pinion and ring gear being constructed and arranged so that the output shaft rotates at a speed of, typically, one third of that of the crankshaft. The engine is capable of operating on a two-stroke cycle, or a four-stroke cycle, and is adaptable to diesel operation.

The crankshaft has an unusual motion, described as a tumbling motion. As stated, the power cylinder axis and the charge cylinder axis are mutually at right angles intersecting in the engine axis, which is normal to a plane containing the power cylinder and charge cylinder axes. The power pistons are journalled on the central crank pin of the crankshaft, consequently the engine has a mechanism such that the central pin has a straight line reciprocating motion. The charge piston is effectively journalled on the aligned crank pins which, therefore, reciprocate along the charge cylinder axis.

As well as reciprocating along the charge cylinder axis, the aligned crank pins have also a motion of rotation.

The reciprocation and rotation of one aligned crank pin is, in the present invention, utilized to provide activating means for the fuel injection means.

SUMMARY OF THE INVENTION

Drive remaining as above described by means including an eccentric pinion driven by one of the two aligned crank pins, a generally cylindrical cam is secured to the aligned crank pin remote from the eccentric pinion. The cam thus has (substantially) simple harmonic reciprocating motion along the charge cylinder axis, and simultaneous rotation. Two lifters are provided, one on each side of the charge cylinder axis being normally centered on the power cylinder axis, the lifters being adapted to be operated by the reciprocating rotating cam as it rotates moving along the charge cylinder axis. The rotating cylindrical cam has a relieved portion so that, while moving in one direction along the charge cylinder axis only one of the two lifters is moved, the rotating cam clearing the second lifter because of the relieved portion above. Moving in an opposite direction along the charge cylinder axis, the lifter first moved remains stationary because of the relieved portion of the cam, with the second lifter being moved as described with respect to motion of the first lifter. The relieved portion is hereinafter referred to as means for clearance.

Ends of the lifters remote from the cam are in operative engagement with the push rods activating known fuel injection pump means.

With the lifter being centered on a power cylinder axis as described above, injection occurs at, or close to, top dead center of each power piston. Means are provided for adjustment of the position of each lifter so that injection can be made earlier at an adjustable advance.

Since the cam rotates during its reciprocating motion, rolling contact with the lifters is achieved. Rotation is at (sensibly) constant angular velocity and lineal speed of reciprocation, being simple harmonic motion, varies from zero at limits of the motion to maxima as the cam crosses the power cylinder axis, consequently pure rolling is not effected but combined rolling and sliding contact occur.

The lifters have generally convex surfaces contacting the cam, which surface can have an initial reverse curvature defining a concave portion, so that initial contact of the cam with the lifter occurs with minimal impact. This reduces noise, and wear of the cam and lifter.

A generalized description of the patented engine related to drawings is given below as an aid to understanding a detail description, also related to drawings, of the present invention. The detail description of the present invention is given by way of example, being capable of expression by means other than those particularly described and illustrated.

DESCRIPTION OF THE DRAWINGS

FIG. 1 is an elevation, at reduced scale, of an internal combustion engine according to United States Patent 3,329,134.

FIG. 2 is a section on 2—2 FIG. 1, showing horizontal aligned power pistons of the engine in mid position, FIG. 3 is a section on 3—3 FIG. 2 illustrating power take-off means giving 1:3 reduction, FIG. 4 is a section on 4—4 FIG. 1 showing one power piston in a top dead centre position, FIG. 5 is a diagram illustrating crankshaft motion, FIG. 6 is an elevation, partly sectioned, showing an assembly of a charge piston and slide blocks to a crankshaft and cam according to the present invention, FIG. 7 is a generalized top plan of an internal combustion engine with fuel injection activation means according to the present invention, FIG. 8 is a section on 8—8 FIG. 7, FIG. 9 is a fragmented section on 9—9 FIG. 8, FIG. 10 is a side elevation of a lifter having an alternative generally convex inner end wall, FIGS. 1–5 are prior art, being an internal combustion engine according to United States Patent 3,329,134, and in FIG. 6 the charge piston and slide blocks are as in the patented engine, with the crankshaft being modified substantially only by addition of the cam.

GENERALIZED DESCRIPTION OF THE PATENTED ENGINE

FIGS. 1, 2, and 3

A two stroke engine according to the patent above has aligned horizontally opposed left and right power cylinders 11, 12, and vertically opposed aligned top and bottom charge cylinders 13, 14. The engine has an axis X and a power cylinder axis Y, the X and Y axes are coplanar of a horizontal plane and at right angles intersecting in a charge cylinder axis Z, which axis is vertical.

A power piston has two units, 15, 16, with abutting inner ends secured to one another by bolts 17 so as to be effectively integral, the power piston being journalled on a central crank pin 18 of a crankshaft, so that the pistons reciprocate with the central crank pin having lineal reciprocating motion, approaching simple harmonic motion, on the Y axis.

FIGS. 4 and 6

Referring particularly to FIGS. 4 and 6, the charge cylinders have upper and lower piston elements 19 and 21 with inner ends bolted to spaced rectangular slide blocks 23 and 24, with aligned crank pins 26, 27 of the crankshaft journalled in the spaced slide blocks as shown in FIG. 6. The crankshaft is designated generally 25 and has the central crank pin 18 aforesaid, with integral webs 29 extending from the central crank pin 18 to the aligned crank pins 26, 27 as shown. The charge piston elements being bolted, respectively, to outer ends of the slide blocks, the charge piston too is effectively integral being journalled on the aligned crank pins. The aligned crank pins have extensions 31 and 32.

Drive, FIGS. 1 and 3

A flanged housing 33 is concentric with the engine axis X, a drive shaft 34 extends externally through the housing, the shaft having a centreline coincident with the engine axis X, and an inner end within the housing. A ring gear 35 having internal teeth is secured to the inner end of the shaft, and an eccentric pinion 36 is keyed to the crank pin extension 32 (FIGS. 3 and 6), the pinion having teeth engaging the ring gear 35. Thus rotation of the crankshaft drives the drive shaft 34 at, in the particular engine illustrated, a 1:3 speed reduction.

Crankshaft motion, FIG. 5

As indicated diagrammatically in FIG. 5, the essentially integral power piston elements 15, 16 reciprocate along the Y axis with the essentially integral charge piston elements reciprocating one the z axis. With the crankshaft having constant angular velocity throughout a complete revolution, these motions would be simple harmonic, having a phase relationship indicated in solid and broken outline in FIG. 5.

It is clear from FIG. 4 that the central crank pin 18 reciprocates along the Y axis (as viewed in FIG. 5) and it is clear from FIG. 4 and FIG. 6 that, the slide blocks having straight line reciprocating motion, the aligned crank pins 26, 27, also have simple harmonic reciprocating motion along the Z axis (as viewed in FIG. 5).

In actuality, paths of reciprocation are in lines parallel to the Y and Z axes (as these axes have been defined with reference to FIGS. 1, 2, and 3) in planes normal respectively to the Z and Y axes. Hereinafter movements described as being along the X, Y, or Z axis means, as viewed for instance in a projection such as FIG. 4 or FIG. 5, actual motions being as above described.

The aligned crank pins 26, 27 FIG. 6 have a common axis X'—X' as seen in FIG. 6, which axis is parallel to the X—X axis in a plane containing the X and Z axes. The aligned pin 27 and the extension 32 (and the aligned pin 26 and its extension 31) as well as reciprocating as aforesaid, have a motion of rotation about the X' axis, the extensions 31 and 32 being coaxial with the X'-axis.

DETAILED DESCRIPTION OF THE PRESENT INVENTION

FIGS. 5 and 6

Rotation of the extension 32 as it reciprocates on the Z axis (as viewed in FIG. 5) is utilized in the present invention to activate a fuel injection means, a cam 72 being a keyed to the extension as seen in FIG. 6.

FIGS. 8 and 9

The extension 32 (FIG. 6) has an outer end 71 to which a cam 72 is secured by means of a key 73. The cam is a short cylinder centered on the axis X' having an outer cylindrical periphery 74 a portion of which is relieved as shown at 75, the relieved portion being a clearance means avoiding interference as is later explained.

A left valve lifter 76 is rectangular in section as seen in FIG. 9, having a convex outer end wall 76.1 adapted for line contact with the cam 72, and a shoulder 76.2 at an end of the lifter remote from the outer end wall. A push rod 76.3 engages an outer end wall of the shoulder 76.2. The end wall 76.1 has a high 76.4, the end wall intersecting side walls of the lifter at 76.5. The foregoing applies also to a right lifter 77 having a convex outer end wall 77.1, a shoulder 77.2, a push rod 77.3, a high 77.4, with the convex end wall intersecting side walls of the lifter at 77.5. The intersections of the convex outer surfaces are, when the lifters are in an inner position shown in full outline in FIG. 8, spaced from the Z axis by a distance H. The highs 76.4 and 77.4 are at a distance H–L from the Z-axis, so that each lifter is capable of maximum lift L along the Y-axis, the lifters being centered on the Y-axis as seen in FIG. 8. The lift is from an inner full line position of the lifters, to a lifted position, shown with respect to the right lifter 77, in broken outline designated 77.41, and it is seen that the lifters are constrained to motion of translation along the Y-axis between the inner position and the lifted position.

As explained with reference to FIG. 5, the aligned crank pin 27 reciprocates along the Z-axis. In FIG. 8 a lower limit of reciprocation is indicated in solid outline, an upper limit of motion being indicated in broken outline. The outer end 71 of the extension 32 reciprocates between these limits, the reciprocation having a length designated S in FIG. 8. The cylindrical cam 72 has a radius R such that $\pi R = S$, R being equal to or slightly greater than H.

The lifters 76 and 77 are slideable rsepectively in guides 78 and 79. A securing bracket 81 has bolts 81.1 and 81.2 for securing the guide 78 and a bracket 82 having bolts 82.1 and 82.2 has similarly secured therewithin the guide 79, the bolts being locked by locknuts 82.3 and 82.4.

FIG. 7

In FIG. 7 an internal combustion generally as the patented engine is designated generally 10 with opposed power cylinders 11, 12, and charge cylinders of which only the top charge cylinder 13 is seen, as previously described.

The securing brackets 81 and 82 (FIG. 8) are formed integral of a housing 90 bolted to a crankcase of the engine as indicated. A conventional injection means 91 has a cylinder 92 a piston rod of a piston of which is reciprocated by motion of the left push rod 76.3 (FIG. 7) forcing a fuel charge through pressure piping 93 to an injector 94 of the power cylinder 11 when its position approaches top dead centre of a compression stroke. A second injection means, generally 95, is similarly activated by the right push rod 77.3 (FIG. 7), and injects fuel to the power cylinder 12. The injection means per se forms no part of the present invention which is directed to means to activate the injection means.

OPERATION

The lifters 76 and 77 activate the conventional diesel injectors through the push rods 76.3 and 77.3, as explained, the injectors being adapted to inject a metered charge of fuel into each power cylinder at a particular time. An injector having a piston reciprocating within a cylinder and operating at a constant stroke can be used. Each stroke of the injector piston provides an injector cylinder-full of fuel, excess being bled off before the fuel reaches the engine cylinders, thus a required amount of fuel is injected. Injectors of this kind being well known, are not further described herein, nor is known linkage by means of which the push rods actuate the diesel injectors, such linkages also being well known.

Referring to FIG. 8, the cam 72 is rotating clockwise as indicated by an arrow 84 and is commencing to move upwards the motion being simple harmonic or a close approach thereto. After having travelled a short distance the cylindrical cam surface reaches 77.5 and, as the cam continues to rotate and travel to the right, the lifter 77 moves inwards of the guide 79 to a maximum lift L attained when the cam is central of the Y axis. At this position one power cylinder is at top dead center. With fuel injection occurring at this position, injection is at 0° advance from top dead center. Injection can be advanced to occur before top dead center by slacking the bolt 82.2 and tightening the bolt 82.1. In stating that the cam would contact the lifter 77 as described above, it is assumed that $R=H$. Ordinarily, H is somewhat greater than R so that effective lift is reduced accordingly.

At the upper and lower limits, the relieved portion 75 is central of the Z-axis and remote from the Y-axis. In the Y axis position of maximum lift, the relieved portion 75 is central of the Y axis, and it is seen that the relief is required to be such that the relieved portion clears the left lifter 76 to avoid interference, clearance of course being required throughout a 90° rotation which takes place as the cam moves from the solid outline position to the Y axis position. The motion continuing the lifter 77, being urged into contact with the cam by the push rod 77.3, retracts until the shoulder 77.2 again contacts the guide 79. Cam motion from the broken outline limit to the lower limit now commences, with the left lifter 76 moving as described with reference to the right lifter 77, which remains stationary as the cam moves from downwards since the relieved portion 75 is such that it clears the convex end wall 77.1.

Note that with the cam 72 having a radius such that $\pi R = S$ approach to rolling contact between the cam and the convex surfaces 76.1, 77.1, of the lifters, see FIG. 8, is more nearly attained than, otherwise, would be the case.

FIG. 10

FIG. 10 shows an alternative lifter 77–A having, instead of the convex end wall 76.1 of the lifter 76, a surface shaped as shown at 77.1–A with a concave portion 77.1–C adjacent the intersections 77.5. Thus when the cam contacts the concave portion commencing to move the lifter outwards, there is a lower initial acceleration. The surface 77.1–A can be symmetrical as shown, or can be adapted to give a quick return stroke.

Referring now to the lifters shown in FIG. 7 it is seen that the direction of travel of the cam, and its direction of rotation, are such that there is rolling contact between the cam and the convex surfaces. However, since the reciprocating motion of the cam is simple harmonic, lineal velocity of translation is not constant during contact, thus there is some sliding. With a combination of sliding and rolling contact, particularly using a lifter shaped as at 77.1–C FIG. 10, there is little impact, consequently drive is quiet and the moving parts can readily be designed so that little wear takes place.

EQUIVALENTS

In the engine described the power piston is journalled on a central pin of the crankshaft, with the effectively integral charge piston being journalled on the spaced aligned crank pins. Journalling of the power and charge pistons can be reversed, requiring obvious change in injection activation means described and illustrated, giving mechanism equivalent to the mechanism described and illustrated.

It is unimportant what particular injection means is used, any injection means which can be activated by reciprocating lifters can be substituted.

U.S. application S.N. 77,216 of the present inventor teaches a modification of the patented engine in which slide blocks (23, 24 FIGS. 4 and 6) are not used, this modification is well suited for use with the instant activation means.

I claim:

1. In an internal combustion engine having; an essentially integral power piston (15, 16) reciprocating within opposed power cylinders (11, 12) aligned on a Y-axis; an essentially integral charge piston (19, 21) reciprocating within opposed charge cylinders (13, 14) aligned in a coplanar Z-axis; the Y and Z axes being at right angles and having a point of intersection; an X or engine axis mutually perpendicular to, and passing through, the point of intersection of the Y and Z axes; a crankshaft having two crank pins (26, 27) spaced equally from a central crank pin (18) the spaced crank pins (26, 27) being on an X'-axis parallel to the X-axis; the essentially integral power piston being journalled on the central crank pin; the charge piston being journalled on the aligned crank pins so that the aligned crank pins reciprocate along the Z-axis moving a distance between an upper and a lower limit passing through a central position midway between the limits during reciprocation, the aligned crank pins concurrently rotating about the X'-axis; in combination with the foregoing, a fuel injection activation means including:

(a) an extension (32) of one crank pin aforesaid (27); a cam co-axial with the X'-axis secured to the extension so that the cam reciprocates and rotates as aforesaid, (b) a right lifter (77) having an inner end wall (77.4) and an outer end wall, the lifter being constrained to motion of translation along the Y-axis between an inner position and a lifted position, the inner end wall being adapted for line contact with the cam during a part of its motion from the lower position to the upper position, so as to be moved thereby, (c) a left lifter (76) having an inner end wall (77.4) the lifter being constrained to motion of translation along the Y-axis between an inner position and a lifted position, the inner end wall being adapted for line contact with the cam during a part of its motion from the upper position to the lower position, so as to be moved thereby, (d) the cam having means (75) for clearance so that only the right lifter is moved when the cam moves from the lower to the upper limit, (e) a right push rod (77.3) the push rod being urged against the outer end wall of the right lifter urging it towards the inner position, so that the right lifter moves from the inner position to the lifted position and back to the inner position as the cam moves from the lower limit to the upper limit, the push rod being reciprocated by the lifter, (f) a left push rod (76.3), the push rod being urged against the outer end wall of the left lifter urging it towards the inner position so that the left lifters moves from the inner position to the lifted position and back to the inner position as the cam moves from the upper limit to the lower limit, the push rod being reciprocated by the lifter, (g) a left fuel injection means operatively connected to the left push rod and activated thereby, (h) a right fuel injection means operatively connected to the right push rod and activated thereby, each fuel injection means being adapted to inject a charge of fuel to one power cylinder at a position in which the power piston approaches top dead center of a compression stroke of that cylinder into which the fuel is being injected.

2. Fuel injection activation means according to claim 1 wherein; the cam is generally cylindrical being co-axial with the X-axis; the cam having a relieved portion (75) which is central of the Z-axis on a side of the cam remote from the Y-axis when the cam is at the upper limit and when the cam is at the lower limit; the relieved portion being means for clearance as aforesaid.

3. Structure is defined in claim 2, wherein the generally cylindrical cam has a radius R such that $\pi R$ equals the distance between the upper and lower limits of reciprocation.

4. Structure is defined in claim 3; and means to alter the position at which the fuel is injected.

5. Structure is defined in claim 4; and means to move each lifter axis to a position parallel to and spaced from the Y-axis in a plane containing the X and Y axes so as to alter the position at which the fuel is injected.

6. Structure is defined in claim 3; each lifter having a generally convex inner end wall adapted for line contact as aforesaid.

7. Structure as defined in claim 6, the generally convex inner end wall of each lifter having a concave portion at a side which is contacted by the cam as it commences to move the lifter from the inner position to the lifted position.

8. Structure as defined in claim 5, each lifter having a generally convex inner end wall adapted for line contact as aforesaid.

9. Structure as defined in claim 5, the generally convex inner end wall of each lifter having a concave portion at a side which is contacted by the cam as it commences to move the lifter from the inner position to the lifted position.

References Cited

UNITED STATES PATENTS

| | | | |
|---|---|---|---|
| 1,056,746 | 3/1913 | Pitts | 123—55A |
| 1,383,308 | 7/1921 | Johnson | 123—55A |
| 2,223,100 | 11/1940 | Foster | 123—55A |
| 2,844,040 | 7/1958 | Bancroft | 123—55A |
| 3,277,743 | 10/1966 | Kell | 123—55A |
| 3,329,134 | 7/1967 | Llewellyn | 123—55 |

WENDELL E. BURNS, Primary Examiner

U.S. Cl. X.R.

123—55, 55A, 56BC, 56C